United States Patent
Tellinger et al.

(10) Patent No.: US 9,398,054 B2
(45) Date of Patent: Jul. 19, 2016

(54) OPTIMIZED USER RE-DISTRIBUTION OVER S-CSCF ENTITIES

(75) Inventors: Jan Anders Tellinger, Alvsjo (SE); Annika Jonsson, Enskede (SE); Timo Forsman, Alvsjo (SE); Tobias Austrell, Alvsjo (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 260 days.

(21) Appl. No.: 13/491,812

(22) Filed: Jun. 8, 2012

(65) Prior Publication Data
US 2012/0315904 A1 Dec. 13, 2012

Related U.S. Application Data

(60) Provisional application No. 61/496,793, filed on Jun. 14, 2011.

(30) Foreign Application Priority Data

Jun. 10, 2011 (EP) .................................... 11169623

(51) Int. Cl.
*H04W 60/00* (2009.01)
*H04L 29/06* (2006.01)
*H04L 29/08* (2006.01)

(52) U.S. Cl.
CPC ........ *H04L 65/1016* (2013.01); *H04L 65/1073* (2013.01); *H04L 67/1008* (2013.01); *H04L 65/1046* (2013.01)

(58) Field of Classification Search
CPC ............. H04L 65/1016; H04L 65/1046; H04L 65/1073; H04L 67/1008; H04L 29/08; H04L 29/06; H04L 45/22; H04L 12/66; H04L 65/00; H04L 29/14; H04W 4/24; H04W 60/00

USPC ................ 455/435.1, 456; 370/230, 252, 259
See application file for complete search history.

(56) References Cited

U.S. PATENT DOCUMENTS

2009/0180378 A1 7/2009 Noel et al.
2009/0232128 A1* 9/2009 Paulis .................. H04M 3/2281
                                                              370/352

(Continued)

FOREIGN PATENT DOCUMENTS

| WO | WO 2010/072261 | * | 7/2010 | .............. H04L 29/06 |
| WO | WO 2010/072261 A1 | | 7/2010 | |
| WO | WO 2011/054390 | * | 5/2011 | .............. H04L 29/06 |

OTHER PUBLICATIONS

3GPP: "3rd Generation Partnership Project; Technical Specification Group Services and System Aspects; Feasibility Study on IMS Evolution; (Release 9)", 3GPP Draft; 23.812-115_DIFF, 3rd Generation Partnership Project (3GPP), Mobile Competence Centre, 650, Route Des Lucioles , F-06921 Sophia-Antipolis Cedex, France, vol. SA WG2, May 4, 2011, XP050515595.

*Primary Examiner* — Khawar Iqbal
(74) *Attorney, Agent, or Firm* — Patents on Demand, P.A.; Brian K. Buchheit; Scott M. Garrett (57) ABSTRACT

Embodiments of the present invention provide a network entity of an IMS network, in which a registered user is being served by an assigned Serving-Call Session Control Function, S-CSCF. The network entity includes a memory storing data that includes an identity of at least one better-matching S-CSCF in the IMS network having capabilities better suited for serving the registered user than the assigned S-CSCF. The network entity is configured to obtain an indication of the availability of the better-matching S-CSCF, and when the better-matching S-CSCF entity is available to initiate a transfer so that the registered user is served by the better-matching S-CSCF. The network entity may be the assigned S-CSCF, or may be an I-CSCF. Embodiments of the present invention provide a method of transferring a registered user to a better-matching S-CSCF.

13 Claims, 5 Drawing Sheets

(56) References Cited

U.S. PATENT DOCUMENTS

| | | | |
|---|---|---|---|
| 2010/0189248 A1* | 7/2010 | Ding et al. | 379/211.02 |
| 2010/0287406 A1* | 11/2010 | Ishii | 714/4 |
| 2011/0255550 A1* | 10/2011 | Ye | H04W 24/02 370/401 |
| 2011/0292839 A1* | 12/2011 | Swaminathan | H04L 65/1069 370/259 |
| 2012/0026919 A1* | 2/2012 | Jin | H04M 3/58 370/259 |
| 2012/0113796 A1* | 5/2012 | Qiu | H04L 65/1073 370/216 |
| 2012/0185613 A1* | 7/2012 | Noldus | H04L 29/12066 709/248 |
| 2013/0094494 A1* | 4/2013 | Lim | H04W 76/025 370/352 |
| 2013/0117467 A1* | 5/2013 | Den Hartog et al. | 709/244 |
| 2015/0256562 A1* | 9/2015 | Noldus | H04L 65/1069 370/352 |
| 2016/0037472 A1* | 2/2016 | Shi | H04L 65/1016 455/435.1 |

\* cited by examiner

OPTIMIZED USER RE-DISTRIBUTION OVER S-CSCF ENTITIES

CROSS-REFERENCE TO RELATED APPLICATIONS

This application claims the benefit of European Patent Application No. EP11169623 filed Jun. 10, 2011, and U.S. Provisional Application No. 61/496,793 filed Jun. 14, 2011, the disclosures of which are incorporated herein by reference.

TECHNICAL FIELD

The present invention relates to transferring, or re-distributing a user being served by a Serving-Call Session Control Function (S-CSCF) to another S-CSCF in an IP Multimedia Subsystem (IMS) network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

Figure 1:
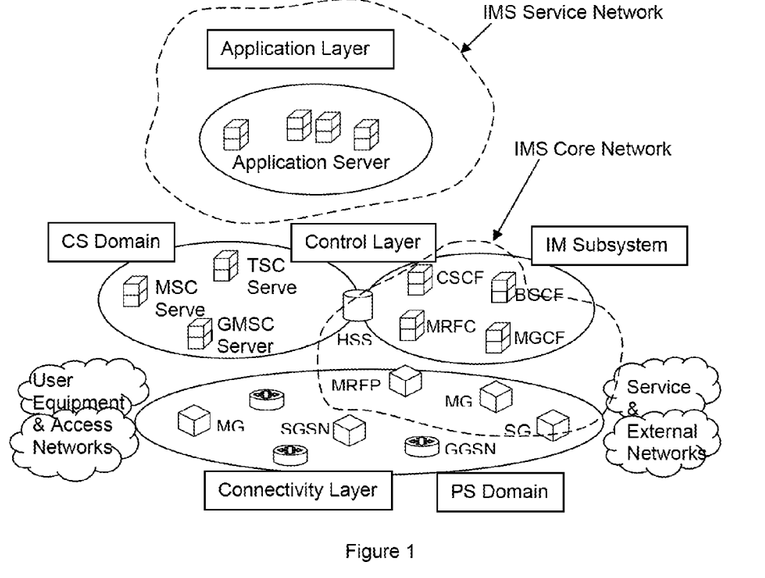
FIG. 1 illustrates schematically the integration of an IP Multimedia Subsystem into a 3G mobile communications system.

FIG. 1 illustrates schematically how the IMS fits into the mobile network architecture in the case of a GPRS/PS access network (IMS can of course operate over other access networks). Call/Session Control Functions (CSCFs) operate as Session Initiation Protocol (SIP) proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber; and the Interrogating CSCF (I-CSCF) whose role is to identify the S-CSCF to be used and to forward to that S-CSCF a request received from a SIP terminal via a P-CSCF. Within the IMS service network, Application Servers (ASs) are provided for implementing IMS service functionality and to provide services to end users.

Many IMS networks include several S-CSCFs, some or each of which may have different capabilities more or less suited for different users or services. In IMS networks with more than one S-CSCF, there is normally a procedure involving one or more selection criteria that are used to select which S-CSCF is most suitable for serving a user that registers in the network. The selection criteria can be of many different types; user capabilities (e.g. users could be assigned gold, silver and bronze categories according to their capabilities), user features, user access types, user domain names, user telephone numbers, user visited network identities, user contact IP-address range, user type (for example wild-carded PSI, wild-carded IMPU or normal IMPU), user activity, etc. The I-CSCSF will select one S-CSCF for the user using appropriate criteria based upon information related to the user received from the user's Home Subscriber Server (HSS), the capabilities required for requested services, and the known capabilities of the different S-CSCF entities handled by the I-CSCF. In general an I-CSCF will be configured to select an S-CSCF that best matches the capabilities for a certain user, and will only select an S-CSCF with fewer, or worse, matching capabilities when the best matching S-CSCF is unavailable. For example, the best-matching S-CSCF may not be available because it is already operating at full capacity due to the number of other registered users it is already serving. In that case new/initial registrations can be 'redirected' to a non-best matching S-CSCF. Also, in some cases an S-CSCF may initiate moving non-active but registered users when it is put into a temporary administrative state for maintenance purposes.

Problems can arise because as soon as a user has been registered and an S-CSCF allocated, the user will continue to be served by that S-CSCF until the user is deregistered. This is because the identity of the S-CSCF is stored in the user's HSS and does not change for as long as the user is registered and the S-CSCF is available.

One fundamental problem is that when the S-CSCF having the best-matching capabilities for a certain user is unavailable/out of service, the I-CSCF may assign another S-CSCF for the user, but when the best-matching S-CSCF becomes available again or comes back into service, the user will remain with the assigned S-CSCF. However, it would be preferable, both for the user and for the operator, if the user could be transferred to the best-matching S-CSCF without having to deregister.

Another situation that can arise is when a user starts to subscribe to a new service and this is provisioned while the user is already registered and assigned to an S-CSCF that does not have a capability required by the new service.

Another situation that can arise is that another S-CSCF is upgraded and becomes available while the user is registered, the other S-CSCF having one or more additional capabilities providing a better match when compared to the assigned S-CSCF that the user is registered with.

Another problem that can arise is when a service capability, which the user has requested, is removed from the assigned S-CSCF meaning that the capability is no longer available.

The present invention has been conceived with the foregoing problems in mind.

SUMMARY

In accordance with one aspect there is provided a network entity of an IMS network in which a registered user is being served by an assigned S-CSCF. The network entity comprises a memory storing data that includes an identity of at least one better-matching S-CSCF in the IMS network having capabilities better suited for serving the registered user than the assigned S-CSCF. The network entity is configured to obtain an indication of the availability of the better-matching S-CSCF, and when the better-matching S-CSCF entity is available to initiate a transfer so that the registered user is served by the better-matching S-CSCF.

The network entity may be the assigned S-CSCF, and may be configured to determine the identity of the at least one better-matching S-CSCF. The memory may also store user-specific selection criteria used to select the S-CSCF as the assigned S-CSCF serving the registered user, information identifying the S-CSCF's capabilities used for the selection criteria, and information identifying the capabilities of other S-CSCFs in the IMS network. The S-CSCF may be further configured to evaluate the user-specific selection criteria with reference to the capabilities of the other S-CSCFs so as to determine the identity of the better-matching S-CSCF.

Alternatively, the network entity may be an I-CSCF. The I-CSCF may be configured to receive an identity of the assigned S-CSCF, user-specific selection criteria used to select the S-CSCF as the assigned S-CSCF and information identifying the assigned S-CSCF's capabilities used for the selection criteria from a HSS, when the user registers. The memory may also store information identifying the capabilities of other S-CSCFs in the IMS network, the I-CSCF being further configured to evaluate the user-specific selection criteria of the other S-CSCFs so as to determine the identity of said at least one better-matching S-CSCF.

According to another aspect there is provided a method of transferring a user registered in an IMS network from being served by an assigned S-CSCF to a better-matching S-CSCF. The method comprises: storing data that includes an identity of at least one better-matching S-CSCF in the IMS network having capabilities better suited for serving the registered user than the assigned S-CSCF; obtaining an indication of the availability of the better-matching S-CSCF, and when the better-matching S-CSCF entity is available initiating a transfer so that the registered user is served by the better-matching S-CSCF.

It is an advantage that it is possible to re-distribute already registered users to the most suitable S-CSCF node in an operator's network. This can be based upon selection criteria, which may be operator defined and best suited to the network operator's requirements. The re-distribution of users is an automatic procedure, which means that should an equipment failure arise, the users will be automatically redistributed without the need for manual intervention. Also, the automatic redistribution of users enables the load to be reduced on servers that could otherwise be running at abnormally high loads.

DETAILED DESCRIPTION

Figure 2:
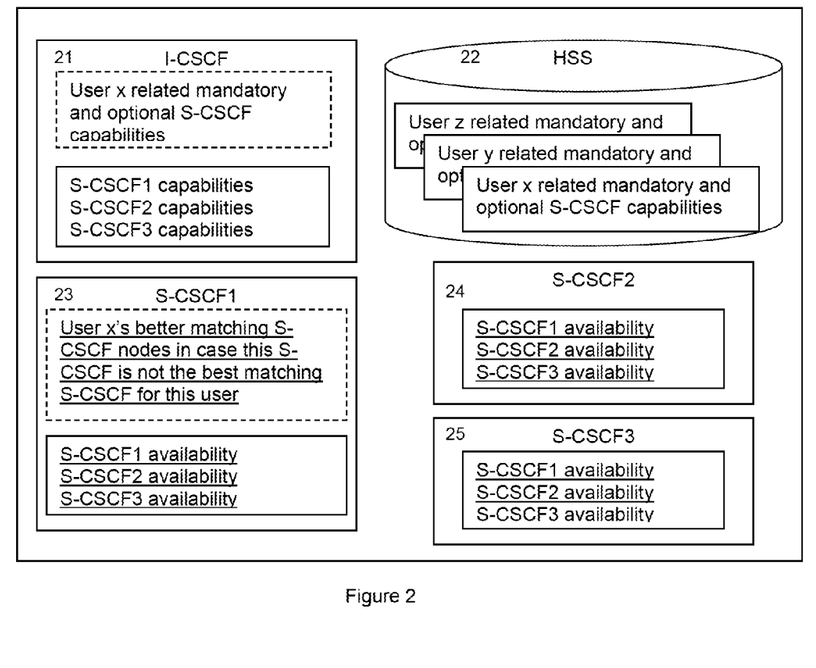
FIG. 2 summarises, in block diagram form, features of the principal IMS entities associated with one embodiment.

In embodiments of the invention each S-CSCF is made aware of two pieces of information:
1 The identities of other S-CSCFs in the network that match the user better; and
2 The availability of any better matching S-CSCFs in the network This is illustrated in FIG. 2, which shows schematically an I-CSCF 21, an HSS 22, and three S-CSCFs-S-CSCF1 23, S-CSCF2 24 and S-CSCF3 25. For the purposes of this illustration it is assumed that a user x is registered and has been assigned to S-CSCF1 23. As shown, I-CSCF 21 knows the capabilities of the S-CSCFs 23, 24, 25. I-CSCF 21 has also been provided with information identifying both the mandatory and optional S-CSCF capabilities related to user x (as indicated by the dashed-line envelope in FIG. 2). This information would have been provided to the I-CSCF 21 by the HSS 22 when user x registered with the IMS. Based on this information, and the availability of the S-CSCFs 23, 24, 25, I-CSCF 21 has selected SCSCFI 23 for user x.

Currently, the S-CSCF1 23 would serve the user continually while the user is registered, even if one or both of the other S-CSCFs 24, 25, had capabilities that better-matched the user but were not selected by the I-CSCF 21 (e.g. because they were unavailable at the time of registration).

However, as shown in FIG. 2, each of the S-CSCFs 23, 24, 25 have information on the availability of the other S-CSCFs. The S-CSCFs 23, 24, 25 may obtain this availability information by polling the other S-CSCFs (as will be described further below in connection with FIG. 4). Also, S-CSCF1 23 has been provided with information about any better-matching S-CSCFs for user x. The embodiment described below in connection with FIG. 5 uses this information to automatically re-distribute a registered user to an S-CSCF that better meets the end user's and the operator's needs, when it comes back into service, thereby overcoming the fundamental problem referred to above.

In an alternative embodiment, each S-CSCF is made aware of three pieces of information:
1 The user specific selection criteria used to select the S-CSCF for each registered user;
2 Its own capabilities that are used as selection criteria by the network for selecting it as the S-CSCF for a user; and
3 The availability and knowledge of the capabilities that are supported by other relevant S-CSCFs in the network.

Figure 3:
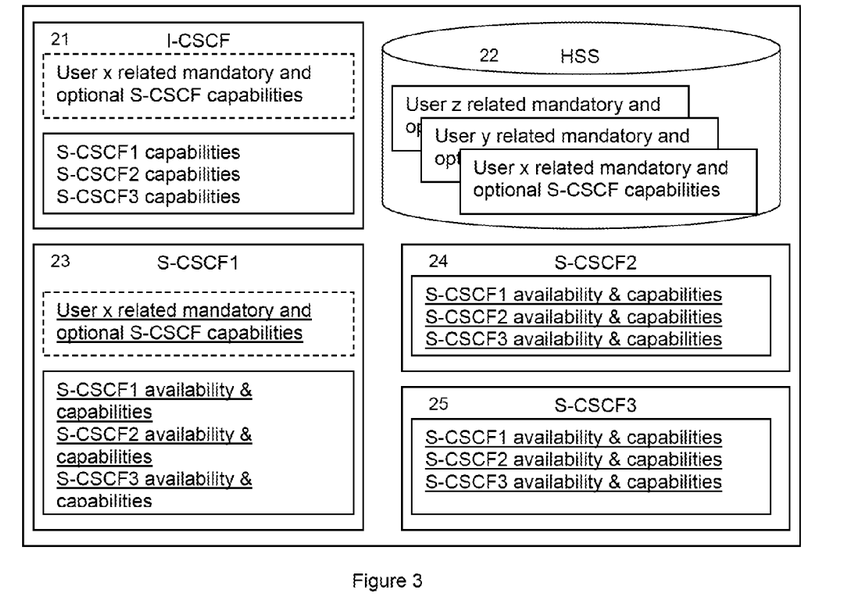
FIG. 3 summarises, in block diagram form, features of the principal IMS entities associated with another embodiment.

FIG. 3 is a similar illustration to FIG. 2, showing the same network entities, which are assigned the same reference numerals. In this case S-CSCF1 23 is provided with the mandatory and optional S-CSCF capabilities required for user x, and each of the S-CSCFs acquires information on the capabilities as well as the availability of the other S-CSCFs. Note that in this case the other S-CSCFs, S-CSCF2 24 and S-CSCF3 25 are not necessarily better-matching S-CSCFs than S-CSCF1. The embodiment described below in connection with FIG. 6 uses this information to overcome the fundamental problem as well as some of the other problems referred to above. This makes it possible for S-CSCF1 23, which has been assigned to registered user x, to determine for itself if it is the best matching S-CSCF or not, and if it is not, to initiate transfer of user x to a better suited S-CSCF.

As already provided for in the standards, IMS network entities, or nodes, poll each other by sending SIP OPTIONS requests to each other. As long as the OPTIONS request is responded to the nodes are assumed to be available and traffic is sent to them. When a node stops responding it is assumed to be unavailable, and it is assumed to have come back into service when it starts responding again (i.e. it starts to reply to OPTIONS). The use of polling for the purposes of the embodiments described herein is illustrated in the signal diagram of FIG. 4, for the three S-CSCFs, S-CSCF1 23, S-CSCF2 24 and S-CSCF3 25 (see FIGS. 2 and 3). S-CSCF1 23 has been assigned to registered user x. S-CSCF1 23 sends a SIP OPTIONS message 401 to S-CSCF2 24 in response to which S-CSCF2 24 returns a SIP 200 OK message 402. For the purposes of the embodiment of FIG. 2 (and FIG. 5 below) the only information that S-CSCF1 23 needs or uses is simply whether or not S-CSCF 2 24 has responded, indicating that it is available. However, for the purposes of the embodiment of FIG. 3 (and FIG. 6 below), the 200 OK message 402 also includes information concerning the capabilities of S-CSCF 2 24 in relation to the S-CSCF selection criteria that the IMS network applies. At step 403 S-CSCF1 23 stores the S-CSCF2 24 availability (FIGS. 2 and 3 embodiments) and capabilities (FIG. 3 embodiment) for future use (as will be described further below).

Figure 4:
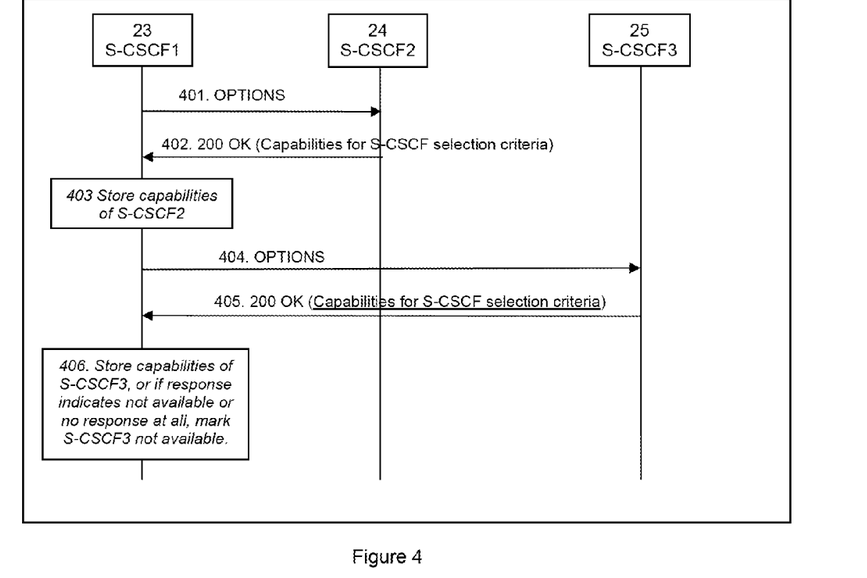
FIG. 4 is a signal diagram illustrating a polling procedure between S-CSCFs in accordance with described embodiments.

Similarly, S-CSCF1 23 sends a SIP OPTIONS message 404 to S-CSCF3 25, in response to which S-CSCF3 25 returns a 200 OK message 405 including (in the FIG. 3 embodiment) information concerning its capabilities in relation to the S-CSCF selection criteria. At step 406 S-CSCF1 23 stores the S-CSCF3 availability/capabilities for future use. However, if the response 405 indicates that S-CSCF3 25 is not available, or if no response is received, then S-CSCF1 23 marks S-CSCF3 25 as being unavailable, although S-CSCF1 23, and the other S-CSCFs, will continue polling by sending SIP OPTIONS messages to S-CSCF3 in case it becomes available again. Note that if S-CSCF2 had not responded with SIP 200 OK message 402, then 5-CSCF1 would have assumed that it is unavailable and marked it accordingly.

When a user registers with the IMS and the I-CSCF detects that a best matching S-CSCF is unavailable or unreachable, the I-CSCF selects a non-best matching S-CSCF for the user. As shown in FIG. 2, the selection criteria are known in the HSS 22 and in the I-CSCF 21. The selection criteria are provided on a per-user basis from the HSS 22 to the I-CSCF 21, for example when the user performs an initial registration. The I-CSCF must also be aware of parameters (i.e. the capabilities) of the available S-CSCFs against which the criteria are assessed so that it can compare and then select the S-CSCF that has the best match.

Figure 5:
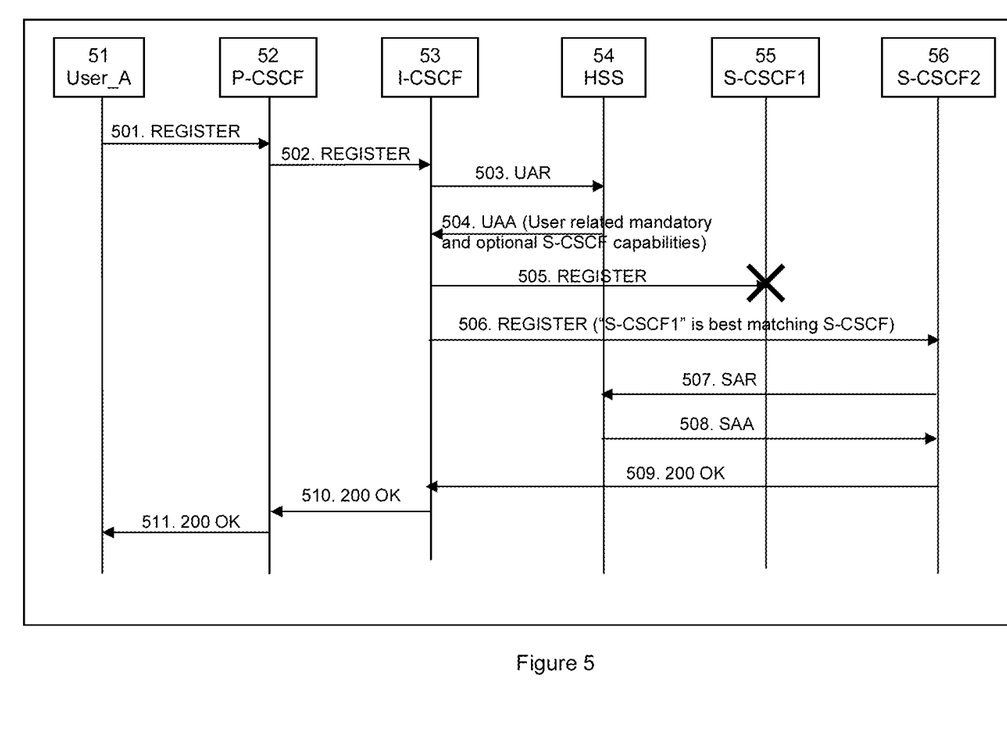
FIG. 5 is a signal diagram illustrating a registration procedure for use in the embodiment of FIG. 2, when a best-matching S-CSCF is not available.

An example of a typical procedure for the embodiment of FIG. 2 is shown in FIG. 5, in which a user, User A 51 initiates a registration procedure in an IMS network that includes a P-CSCF 52, an I-CSCF 53, the user's HSS 54, and two S-CSCFs, S-CSCF1 55 and S-CSCF2 56. An initial register request 501 is sent from User A 51 to the P-CSCF 52, which is forwarded at 502 to the I-CSCF 53. The I-CSCF 53 sends a User Authorisation Request (UAR) 503 to the HSS 54, which returns a User Authorisation Answer (UAA) 504 that includes the mandatory and optional S-CSCF capabilities required. The I-CSCF 53 then uses these to select the best matching S-CSCF, which in this example happens to be S-CSCF1 55. The I-CSCF 53 then attempts to assign S-CSCF1 55 to User A 51 by sending a register message 505 to S-CSCF1 55. However, S-CSCF1 55 is unavailable and does not respond (or else responds with an indication that it is unavailable). Accordingly, the I-CSCF 53 then selects another, non-best-matching, S-CSCF, which in this case is S-CSCF2 56 to which it sends a register message 506. The register message 506 also includes information indicating that S-CSCF1 55 was the best-matching S-CSCF. S-CSCF2 56 then completes the registration procedure by sending a Server Assignment Request (SAR) 507 to the HSS 54, which returns a Server Assignment Answer (SAA) 508 after which SIP 200 OK messages 509, 510, 511, are sent back via I-CSCF 53 and P-CSCF 52 to User A 51.

When S-CSCF2 56 has received the identity (or identities) of the "better matching" S-CSCF(s) from the I-CSCF 53 (at 506), S-CSCF2 56 starts to poll the better matching S-CSCF(s) (e.g. using SIP OPTIONS as described above). In this example only the identity of the one "best matching" S-CSCF, S-CSCF1 55 has been sent to S-CSCF2, 56 but it will be appreciated that there could be more than one better matching S-CSCF. When a better matching S-CSCF (e.g. S-CSCF1 55) becomes available, 5-CSCF2 56, which is currently serving User A 51, initiates a transfer of User A 51 to the better matching S-CSCF. For example, in one of the use cases described, at re-registration, S-CSCF2 sends a NOTIFY to its P-CSCF, which triggers a new REGISTER with an indication that a new S-CSCF is to be selected.

Figure 6:
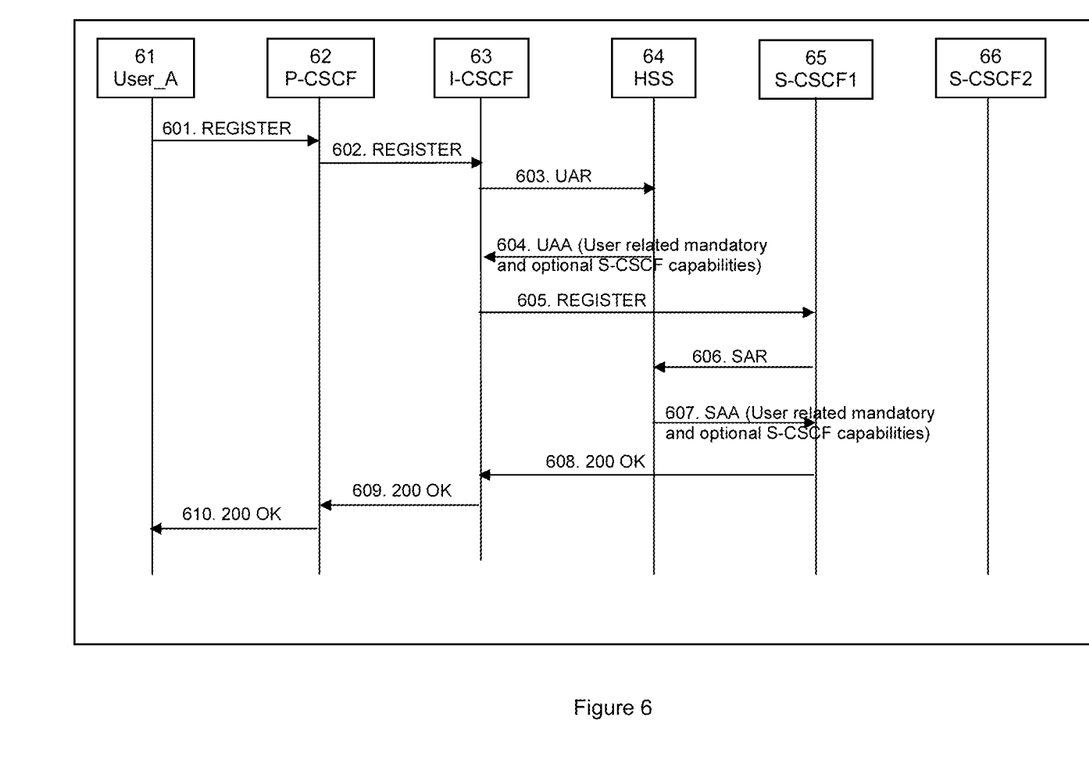
FIG. 6 is a signal diagram illustrating a registration procedure for use with the embodiment of FIG. 3.

FIG. 6 illustrates a typical procedure, similar to that shown in FIG. 5, of another embodiment in which a user, User A 61, initiates a registration procedure in an IMS network that includes a P-CSCF 62, an I-CSCF 63, the user's HSS 64, and two S-CSCFs, S-CSCF1 65 and S-CSCF2 66. In this case the selected S-CSCF, which will be S-CSCF1 65 will be provided with the information, as shown in FIG. 3 for S-CSCF1 23, to enable it to determine for itself if there is a better-matching S-CSCF available. As shown in FIG. 6, the signals 601 to 604 are essentially the same as corresponding signals 501 to 504 as described above for FIG. 5. In this case the I-CSCF 63 sends a register message 605 to S-CSCF1 65, which is available. S-CSCF1 65 then sends a SAR 606 to the HSS 64, which returns a SAA 607 together with information regarding the User's mandatory and optional S-CSCF capabilities. The registration procedure is then concluded by the normal return of SIP 200 OK messages 608-610 via the I-CSCF 63 and P-CSCF 62 to User A 61. Now S-CSCF1 65 starts polling the other S-CSCFs (including, but not necessarily limited to S-CSCF2 66), to ascertain their capabilities, as shown in FIG. 4 at steps 404-406. Once it knows this information, S-CSCF1 65 can then determine for itself if any other S-CSCFs have better matching capabilities.

As with the procedure shown in FIG. 5, if S-CSCF1 becomes aware that a better-matching S-CSCF has become available it can initiate a transfer of User A to that better-matching S-CSCF. However, unlike in the procedure of FIG. 5, in this case the better-matching S-CSCF need not be one that was initially identified by the I-CSCF 63 as being the best-matching S-CSCF, but which was not available at the time of registration. Instead, it is possible that S-CSCF1 65 was initially selected as the best-matching S-CSCF from the available S-CSCFs at that time, but for that condition to change while the user is still registered. For example:

- A new selection criteria for the user is provided by a Push Profile Request (PPR) from HSS, which is an existing request from the HSS to the S-CSCF, used when a modification of a user profile is provisioned, for example when a user has bought a new service;
- Another S-CSCF that has a better criteria match has become available or been added to the network;
- Another S-CSCF has extended its capabilities so that it now fulfils the selection criteria;
- The serving S-CSCF is re-configured and is no longer the best match compared to other available S-CSCFs.

In such cases, because the serving S-CSCF can detect the availability of another S-CSCF, and has the information to be able to determine that the other S-CSCF better matches the user's capability requirements, it can automatically initiate a transfer of the user to the better-matching S-CSCF.

Figure 7:
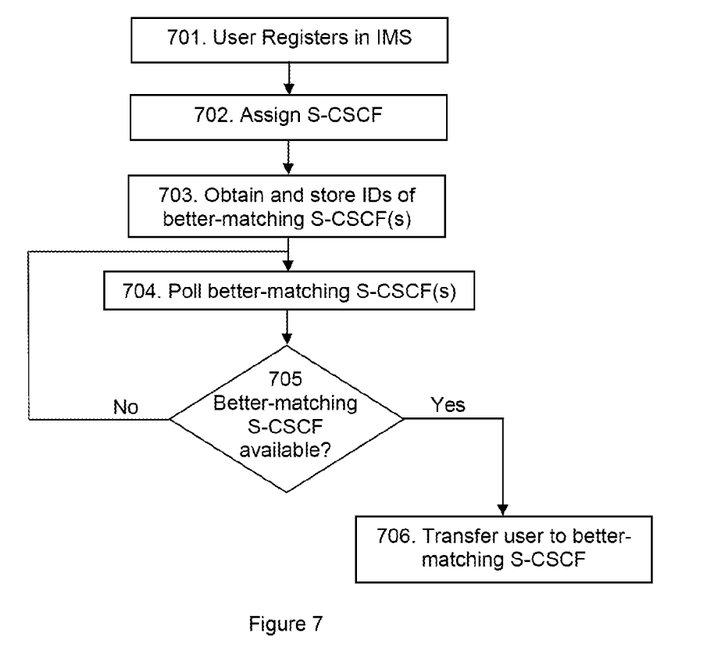
FIG. 7 is a flow diagram illustrating the principal method steps involved in the described embodiments.

The flow chart of FIG. 7 illustrates the main steps in the procedures described above. At step 701a user registers in an IMS network and at step 702 an S-CSCF is assigned to the user. At step 703 the identity of at least one better-matching S-CSCF is obtained and stored. Note that the identity could be provided by the I-CSCF (as shown, for example in register message 506 of FIG. 5), or could be determined by the assigned S-CSCF itself based on user-related capability information provided (as shown, for example, in SAA message 607 of FIG. 6) and information obtained by polling the other S-CSCFs (FIG. 4). At step 704 the other, better matching S-CSCFs are polled (e.g. using SIP OPTIONS). At step 705 a determination is made, from the polling responses, as to whether a better matching S-CSCF is available. If no better-matching S-CSCF is available then the polling is continued (step 704). If a better-matching S-CSCF is available then at step 706 a transfer of the user to the better-matching S-CSCF is initiated. This can either be done by providing an indication to the P-CSCF, or by the assigned S-CSCF providing the indication to the I-CSCF.

In another, alternative embodiment, the information on the availability of the other better-matching S-CSCFs could be provided to the I-CSCF, which would then determine when to initiate a transfer of the user. The I-CSCF could detect that a better matching S-CSCF is available at a re-registration of the user. Alternatively, the I-CSCF itself could carry out the polling of the other S-CSCFs, or the assigned S-CSCF could simply forward to the I-CSCF the availability information it has obtained from its polling of the other S-CSCFs. In this embodiment the I-CSCF retains control of the decision as to when and to which S-CSCF to allocate to the user, and the S-CSCF is not involved in the transfer decision. The I-CSCF is given both an allocated S-CSCF and the capabilities information from the HSS. The I-CSCF can then check if the allocated S-CSCF is the best one or not, and if not, and a better S-CSCF is available, it can then select the better one. One problem with this embodiment is that the I-CSCF does not know if the already assigned S-CSCF has any ongoing sessions for the user, so its decision to move the user may result in a disturbance to the user's traffic.

Figure 8:
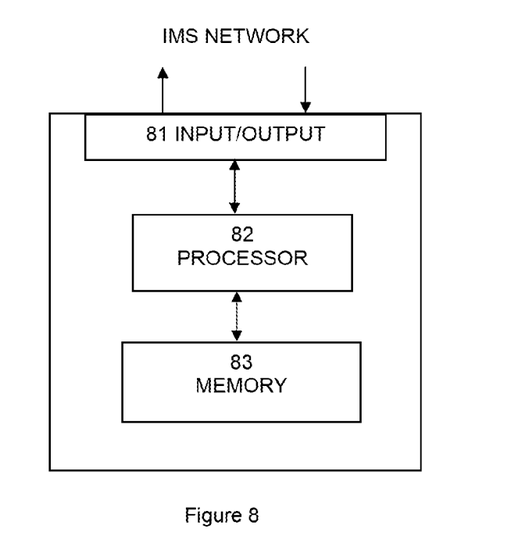
FIG. 8 is a schematic diagram showing the functional hardware elements in a S-CSCF as used in the described embodiments.

FIG. 8 illustrates schematically the principal functional components of an IMS network entity 80, for example an S-CSCF or an I-CSCF, required to perform the procedures described above. The network entity 80 includes an Input/Output 81 for sending and receiving signals from other network entities or nodes, a processor 82 and a memory 83. Memory 83 can be implemented as a non-transitory computer readable storage medium.

The memory 83 stores data that includes an identity of at least one better-matching S-CSCF in the IMS network having capabilities better suited for serving registered user than the S-CSCF to which the user has been assigned. The processor 82 is configured to generate signals to be sent via the Input/Output 81 to the network, and to process data in signals received from the network so as to obtain an indication of the availability of a better-matching S-CSCF, and when the better-matching S-CSCF entity is available to initiate a transfer so that the registered user is served by the better-matching S-CSCF.

Memory 83 can also be implemented as a non-transitory computer readable medium that stores computer-readable instructions, when executed by a processor (e.g., processor 82), implement the methods described in conjunction with FIGS. 4-7.

The invention claimed is:

1. A network entity of an IMS network wherein a registered user is being served by an assigned Serving-Call Session Control Function (S-CSCF), the network entity comprising: a memory and configured to store in the memory data that includes an identity of at least one better-matching S-CSCF in the Internet Protocol Multimedia Subsystem (IMS) network having capabilities better suited for serving the registered user than the currently assigned S-CSCF, wherein the S-CSCF is further configured to store in the memory, user-specific selection criteria used to select the S-CSCF as the assigned S-CSCF serving the registered user, information identifying the S-CSCF's capabilities used for the selection criteria, and information identifying the capabilities of other S-CSCF in the IMS network, the S-CSCF being further configured to evaluate the user-specific selection criteria with reference to the capabilities of the other S-CSCFs so as to determine the identify of said at least one better-matching S-CSCF, wherein the network entity is also configured to obtain an indication of the availability of the better-matching S-CSCF, and when the better-matching S-CSCF entity is available to initiate a transfer so that the registered user is served by the better-matching S-CSCF, wherein the network entity is the currently assigned S-CSCF.

2. The network entity of claim 1 configured to poll the better-matching S-CSCF to obtain the indication of availability.

3. The network entity of claim 2 configured to send a Session Initiation Protocol (SIP) OPTIONS request to the better-matching S-CSCF and to use receipt of a response to the SIP OPTIONS request as the indication of availability.

4. The network entity of claim 1, wherein the currently assigned S-CSCF is further configured to receive the identity of the better-matching S-CSCF from an I-CSCF when the user registers, and to store the identity in the memory.

5. The network entity of claim 1, wherein the S-CSCF is further configured to poll the other S-CSCFs in the IMS network to obtain from them the information identifying their capabilities.

6. A method performed by a network entity of an Internet Protocol Multimedia Subsystem (IMS) network to transfer a user registered in the IMS network currently being served by an assigned Serving-Call Session Control Function, S-CSCF, to a better-matching S-CSCF, the method comprising:

storing data that includes an identity of at least one better-matching S-CSCF in the IMS network having capabilities better suited for serving the registered user than the currently assigned S-CSCF;

storing user-specific selection criteria used to select an S-CSCF as the assigned S-CSCF serving the registered user, information identifying the S-CSCF's capabilities used for the selection criteria, and information identifying the capabilities of other S-CSCFs in the IMS network;

evaluating the user-specific selection criteria with reference to the capabilities of the other S-CSCFs so as to determine the identity of said at least one better-matching S-CSCF;

obtaining an indication of the availability of the better-matching S-CSCF; and when the better-matching S-CSCF entity is available, initiating a transfer so that the registered user is served by the better-matching S-CSCF, wherein the network entity is the currently assigned S-CSCF.

7. The method of claim 6, further comprising:
polling the better-matching S-CSCF to obtain the indication of availability.

8. The method of claim 7, wherein the polling comprises:
sending a Session Initiation Protocol (SIP) OPTIONS request to the better-matching S-CSCF and wherein receipt of a response to the SIP OPTIONS request is used as the indication of availability.

9. The method of claim 6, further comprising:
determining the identity of the at least one better-matching S-CSCF.

10. The method of claim 9, wherein determining the identity of the at least one better-matching S-CSCF comprises:
receiving the identity of the better-matching S-CSCF from an I-CSCF when the user registers.

11. The method of claim 6, further comprising: polling the other S-CSCFs in the IMS network to obtain from them the information identifying their capabilities.

12. The method of claim 6, wherein the transfer is initiated by the currently assigned S-CSCF.

13. The method of claim 6, wherein the transfer is initiated by an Interrogating-Call Session Control Function (I-CSCF).

* * * * *